US007212723B2

(12) United States Patent
McLeod et al.

(10) Patent No.: US 7,212,723 B2
(45) Date of Patent: May 1, 2007

(54) MONOLITHIC WAVEGUIDE ARRAYS

(75) Inventors: Robert R. McLeod, Boulder, CO (US); Eric D. Moore, Boulder, CO (US)

(73) Assignee: The Regents of the University of Colorado, Boulder, CO (US)

( * ) Notice: Subject to any disclaimer, the term of this patent is extended or adjusted under 35 U.S.C. 154(b) by 0 days.

(21) Appl. No.: 11/357,737

(22) Filed: Feb. 16, 2006

(65) Prior Publication Data

US 2006/0193579 A1 Aug. 31, 2006

Related U.S. Application Data

(60) Provisional application No. 60/654,711, filed on Feb. 19, 2005.

(51) Int. Cl.
   *G02B 6/00* (2006.01)
(52) U.S. Cl. .................. 385/147; 264/401; 264/405; 264/477; 264/494; 264/1.24; 264/1.27
(58) Field of Classification Search ............... 383/147; 264/1.24, 1.27, 401, 405, 477, 494
   See application file for complete search history.

(56) References Cited

U.S. PATENT DOCUMENTS

| 5,384,870 | A  | * | 1/1995 | Lieber ..................... 385/15 |
| 6,576,166 | B1 | * | 6/2003 | Perrin et al. ............. 264/1.29 |
| 6,731,857 | B2 | * | 5/2004 | Shelnut et al. ............ 385/143 |
| 2003/0144373 | A1 |  | 7/2003 | Bowman et al. |
| 2005/0180712 | A1 | * | 8/2005 | Shelnut et al. ............ 385/129 |
| 2006/0066006 | A1 |  | 3/2006 | Haraldsson |

OTHER PUBLICATIONS

Ams, M. et al., Optics Express, 13(15), 5676.
Argyros, A., et al., "Photonic bnadgap with an index step of one percent," Optics Express 13, 309 (2005).
Colvin, V.L., et al., "Quantitative model of volume hologram formation in photopolymes," J. Appl. Phys. 81, 5913 (1997).
Colburn et al., "Volume hologram formation in photopolymer material," Appl. Opt 10, 1636 (1971).
Dhar, L et al., "Recording media that exhibit high dynamic range for digital holographic data storage," Optic Letters 24, 487 (1999).
Gambogi, W.J. et al., "Advances and Applications of DuPont Holographic Photopolymers," Proc. SPIE 2043, 2 (1993).
Riishede, J. et al., "All-silica photonic bandgap fibre with zero dispersion and a large mode area at 730 nm," J. Opt. A: Pure Appl. Opt 6, 667-670.
Waldman, D.A., et al., "Cationic ring-opening photopolymerization methods for volume hologram recording," Proc. SPIE 2689, 127 (1996).
Zaho, G. et al, "Diffusopn model of hologram formation in dry photopolymer materials," J. Mod Opt. 41, 1929(1994).

* cited by examiner

*Primary Examiner*—Frank G. Font
*Assistant Examiner*—James P. Hughes
(74) *Attorney, Agent, or Firm*—Townsend and Townsend and Crew LLP

(57) ABSTRACT

A waveguide array is fabricated by providing a photoreactive material and generating an optical intensity pattern corresponding to a geometry of the waveguide array. A relative translation of the photoreactive material is effected through the optical intensity pattern. Thereafter, the photoreactive material is rendered substantially unreactive to light at at least a wavelength of the optical intensity pattern.

33 Claims, 7 Drawing Sheets

MONOLITHIC WAVEGUIDE ARRAYS

CROSS-REFERENCES TO RELATED APPLICATIONS

This application is a nonprovisional of, and claims the benefit of the filing date of U.S. Prov. Pat. Appl. No. 60/654,711, entitled "POLYMER WAVEGUIDE ARRAYS," filed Feb. 19, 2005 by Robert R. McLeod and Eric D. Moore, the entire disclosure of which is incorporated herein by reference for all purposes.

BACKGROUND OF THE INVENTION

This application relates generally to dielectric waveguides. More specifically, this application relates to the formation of monolithic waveguide arrays.

Endoscopes are devices that are used to deliver images from constricted locations and/or through small openings. While endoscopes have the potential to find a wide range of application, they are currently used primarily for diagnostic medical applications. In such applications, an endoscope is inserted into a portion of a patient's body and used to collect images of the portion that may be studied by qualified technicians and/or physicians to aid in the diagnosis of disease or disorders. Medical endoscopes also find utility during therapeutic procedures, where they may be used to provide a physician with an image to aid in the performance of such procedures as surgeries and the like.

Current endoscope structures make use of such technologies as rigid gradient-index ("GRIN") lens rods, flexible fiber bundles, and rigid relay lens systems. Of these, fiber bundle systems are the most widely used because they tend to provide somewhat better flexibility than the other structures. But, even so, such fiber-bundle endoscope structures still suffer from significant limitations in flexibility. This is a consequence of the fact that as the fiber count is increased, the diameter of the fiber bundle increases, becoming progressively more stiff. In addition, the fibers within the bundles cannot typically be stacked regularly, prohibiting the bundles from being identically matched to a grid of pixels on a camera or display chip. Another concern with fiber-bundle structures is that fibers often break, leaving dark pixels in the bundle.

Fiber endoscopes thus provide relatively low performance characteristics, are stiff and heavy, and are costly. The fact that current use of endoscopes is largely limited to medical applications is a reflection of the fact that this is one of the few areas in which these limitations are offset by the significant advantage of being able to perform minimally invasive imaging as used both diagnostically and therapeutically. But even in such medical applications, recent studies have identified risks of transferring infections among patients as endoscopes are reused because of the formation of antibiotic-resistant bacterial biofilms. There are a wide range of other applications in which endoscopes could find utility if improvements could be made in their overall performance, weight, flexibility, and cost.

There is accordingly a general need in the art for improved endoscopes and for improved methods of fabricating waveguides used in such endoscopes.

BRIEF SUMMARY OF THE INVENTION

Embodiments of the invention are thus related to dielectric waveguides and methods for fabricating waveguides. In a first set of embodiments, methods are provided for fabricating a waveguide array. A photoreactive material is provided and an optical intensity pattern corresponding to a geometry of the waveguide array is generated. A relative translation of the photoreactive material is effected through the optical intensity pattern. Thereafter, the photoreactive material is rendered substantially unreactive to light at at least a wavelength of the optical intensity pattern.

In different embodiments, the photoreactive material may be rendered substantially unreactive to light by exposing the photoreactive material to a substantially uniform light or by thermally annealing the photoreactive material. The photoreactive material may comprise a photoreactive polymer precursor. There are a wide variety of suitable polymer precursors that may be used. Merely by way of example, these include thiol-ene, poly-methyl methacrylate ("PMMA"), and the like, although any material that responds to optical exposure with a permanent index pattern that is substantially monotonic with optical intensity may be used. A refractive index of the photoreactive material may increase at locations of exposure to light of a defined wavelength, in some embodiments increasing approximately linearly with an energy density of the exposure to light of the defined wavelength.

There are a variety of different ways in which the optical intensity pattern may be generated in different embodiments. In one embodiment, the photoreactive material is illuminated with a first set of coherent waves focused onto a portion of a plane passing through the photoreactive material. The portion of the plane is also illuminated with a second set of coherent waves that are incoherent with the first set of waves to generate an interference pattern in the portion of the plane. In some instances, the portion of the plane may further be illuminated with a third set of mutually coherent waves, thereby refining control over the exposure and thus the index distribution. Each set of waves is coherent only with itself, thus forming interference patterns only with itself, permitting the addition, either simultaneously or in a later exposure of additional sets of waves to expose the material with additional patterned exposure.

In another embodiment, light is generated with an illumination source. The generated light is filtered with a mask having a portion substantially opaque to a wavelength reactive with the photoreactive material and a portion substantially transparent to the wavelength. The filtered light is focused within the photoreactive material as the optical intensity pattern. The mask may be disposed to generate the optical intensity pattern in a focal plane substantially parallel to a direction of the relative translation or substantially perpendicular to a direction of the relative translation in different embodiments. In some instances, the generated light is spatially incoherent.

In a further embodiment, a first optical intensity pattern corresponding to a geometry of a first subset of the waveguide array is generated, as is a second optical intensity pattern corresponding to a geometry of a second subset of the waveguide array for different first and second subsets. A first relative translation of the photoreactive material is effected through the first optical intensity pattern before generating the second optical intensity pattern and a second relative translation of the photoreactive material is effected through the second optical intensity pattern after generating the second optical intensity pattern. In a similar embodiment, a separate optical intensity pattern is generated for each waveguide comprised by the waveguide array. A separate relative translation of the photoreactive material is then effected through each separate optical intensity pattern.

In still another embodiment, a chamber is filled with the photoreactive material. The photoreactive material is exposed to light through a photomask in contact with the photoreactive material.

The relative translation of the photoreactive material through the intensity pattern may also be effected in a number of different ways. In one embodiment, the optical intensity pattern is maintained in a substantially fixed spatial location, with the photoreactive material being moved through the fixed spatial location. This may be accomplished by providing the photoreactive material in a structure substantially transparent at a wavelength reactive with the photoreactive material and moving the structure. The structure may be moved through an oil immersion chamber filled with oil having a refractive index similar to a refractive index of the photoreactive material. In alternative embodiments, the relative translation of the photoreactive material through the optical intensity pattern may be effected by moving the optical intensity pattern.

In some embodiments, the optical intensity pattern is changed while effecting the relative translation of the photoreactive material through the optical intensity pattern. Such a change may comprise a change in an energy density of the optical intensity pattern and/or a change in shape or size of the optical intensity pattern or may comprise a rotation of the optical intensity pattern relative to the photoreactive material in different embodiments. In embodiments where the optical intensity pattern is generated through a mask, the size and/or shape of the optical intensity pattern may be changed by changing a characteristic of the mask such as its orientation or spatial content, such as may be effected by using a reconfigurable mask such as a spatial light modulator. In other embodiments, effecting the relative translation of the photoreactive material through the optical intensity pattern comprises changing a translation speed of the photoreactive material relative to the optical intensity pattern. The photoreactive material may also be rotated relative to the optical intensity pattern while effecting the relative translation of the photoreactive material through the optical intensity pattern. These various changes enable such effects as changes in magnification and/or changes of the imaging system resolution.

In a second set of embodiments, methods are also provided for fabricating a waveguide array. A photoreactive polymer precursor is provided in a structure substantially transparent at a wavelength reactive with the photoreactive polymer precursor. Light is generated with a spatially incoherent light source. The generated light is filtered with a mask having a portion substantially opaque to the wavelength and a portion substantially transparent to the wavelength. The filtered light is focused within the photoreactive polymer precursor as an optical intensity pattern. The optical intensity pattern is maintained in a substantially fixed spatial location. The structure is moved to translate the photoreactive polymer precursor through the fixed spatial location. Thereafter, the photoreactive polymer precursor is exposed to a substantially uniform light to cure the photoreactive polymer precursor.

In different embodiments, the mask may be disposed to generate the optical intensity pattern substantially parallel to a direction of translation of the photoreactive polymer precursor or substantially perpendicular to a direction of translation of the photoreactive polymer precursor. In some instances, the optical intensity pattern may be changed while moving the structure. In other instances, the structure may be rotated to rotate the photoreactive polymer precursor while moving the structure.

Embodiments of the invention are also directed to waveguide arrays fabricated by the above methods. For example, in a third set of embodiments, a waveguide array is provided as a monolithic structure, i.e. as a continuous structure without joints. The structure has a refractive-index distribution that provides total internal reflection in each of a plurality of nonintersecting regions. Each of the regions extends along a length through the monolithic structure.

The monolithic structure may be a polymeric structure, such as those described above. The refractive-index distribution may be a gradient refractive-index distribution. In one embodiment, a cross section of at least one of the regions varies along the length. In some instances, at least one of the regions may comprise a twist of substantially 180° along the length, making it suitable for incorporation as part of an optical inverter. Examples of structures that may comprise waveguide arrays of the invention include endoscopes, lenslet arrays, optical interconnects, and photonic-crystal waveguides.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, reference labels include a sublabel that follows a hyphen; reference to only the numerical portion of reference labels is intended to refer collectively to all reference labels that have that numerical portion but different latin-letter suffices.

DETAILED DESCRIPTION OF THE INVENTION

1. Overview

Embodiments of the invention provide monolithic waveguide arrays that may be used in a wide array of applications, including endoscopic and other applications, as well as methods for fabricating such monolithic waveguide arrays. The monolithic waveguide arrays may comprise a plurality of waveguides formed from a photoreactive material that changes its refractive index in response to exposure to light of an appropriate wavelength. In certain embodiments, the photoreactive material comprises a photopolymeric material. Specific details of the process are sometimes described below with specific reference to such photopolymeric materials without intended to depart from the more general aspects of the invention.

The photoreactive properties of the material are exploited by creating an optical intensity pattern corresponding to the desired array for the waveguides. This optical intensity pattern is then translated relative to the photoreactive material to cause the desired changes in the photoreactive material. It will be appreciated that the relative motion of the optical intensity pattern and the photoreactive material may be achieved with a stationary material and moving optical intensity pattern, with a stationary optical intensity pattern and a moving material, or with both an optical intensity pattern and material in motion. As explained in detail below, it is generally anticipated that a stationary optical intensity pattern with most commonly be used with moving photoreactive material to achieve the desired translation.

Figure 1A:
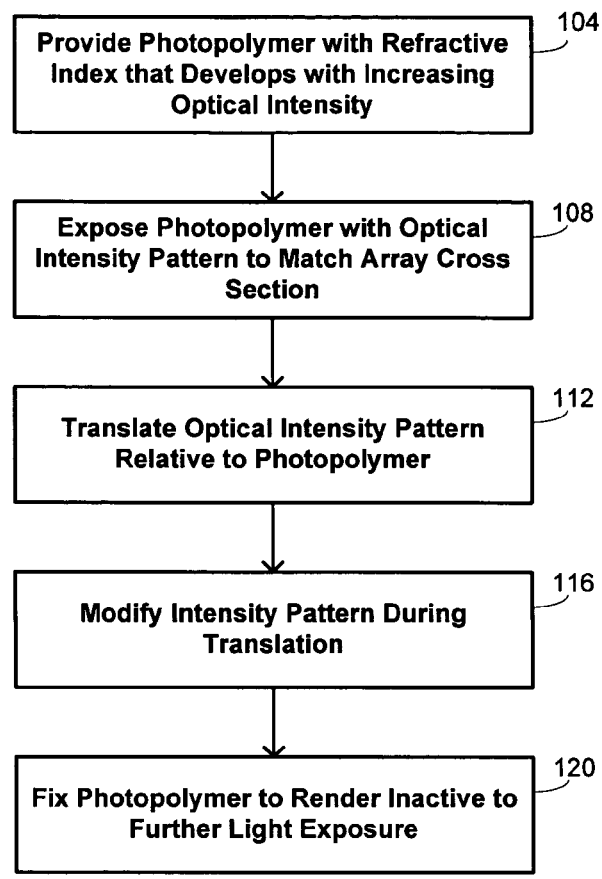
FIG. 1A is a flow diagram summarizing methods of forming monolithic waveguide arrays according to embodiments of the invention.

An overview of this process is summarized with the flow diagram of FIG. 1A, which begins by providing a photopolymer having the desired optical characteristics at block 104. Further details of photopolymers that may be used are provided below, but it is generally preferred that the refractive index of the photopolymer increase with greater optical exposure. In some embodiments, the refractive index increases with approximately linear proportionality to the energy density of optical exposure at a given location, but in other embodiments materials that have a different response of the refractive index may be used. For instance, there are suitable materials in which the refractive index increases approximately quadratically with the energy density of optical exposure, and still other material characteristics may be used in other embodiments. It is generally anticipated that the index response will saturate by slowly approaching some upper limit as the deposited energy is increased. Such saturation may be exploited in some embodiments to produce index features with approximately uniform regions.

Figure 1B:
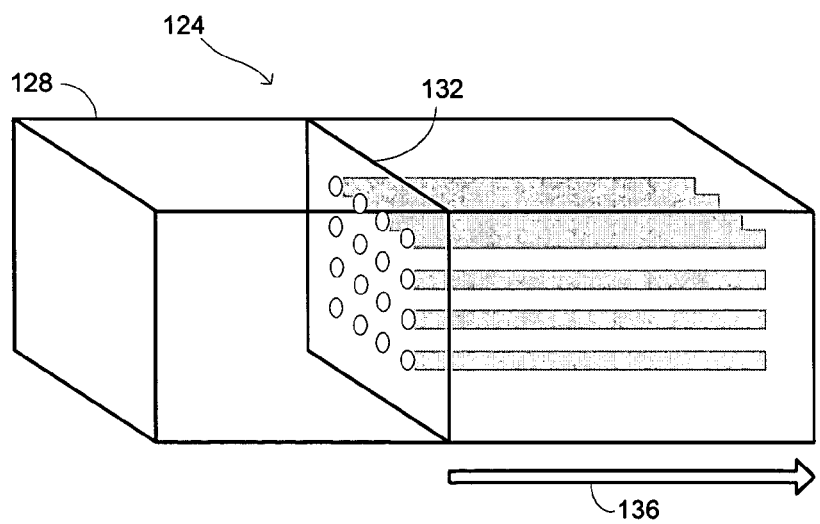
FIG. 1B is a schematic structural illustration of the use of the method illustrated in the flow diagram of FIG. 1A.

As thus indicated at block 108 of FIG. 1A, the photopolymer is accordingly exposed with an optical intensity pattern that matches the desired array cross section. This is illustrated schematically in FIG. 1B, which shows a structure 124 that comprises photopolymeric material 128. The optical intensity pattern is focused in a plane 132 within the photopolymeric material 128, causing local changes in its refractive index. As indicated at block 112 of FIG. 1A, the optical intensity pattern is translated relative to the photopolymeric material, usually by maintaining a fixed position for the optical intensity pattern and moving the photopolymer. This is illustrated schematically in FIG. 1B with an arrow 136 that indicates motion of the photopolymeric material 128 relative to the plane 132 of the optical intensity pattern. A consequence of this motion is that the regions of locally changed refractive index are drawn through the photopolymeric material 128 as indicated by the tracks drawn within the material 128.

In some instances, the optical intensity pattern may be modified during the translation as indicated at block 116. This permits the introduction of certain variations to the quality of the resulting waveguide array. Variations may also be introduced by changing the speed of translation of the photopolymeric material relative to the optical intensity pattern. A uniform waveguide array may result from the use of a substantially unchanging optical intensity pattern when the polymeric material is moved at a uniform speed. A change in the intensity of the optical pattern during translation may be manifested as a tapering of the size of guided modes comprised by the resulting waveguide array. Expansion or contraction of the waveguide mode size may also be accomplished by modifying the numerical aperture of the mask projection system during translation in those embodiments discussed below where the optical intensity pattern is generated by passing light through a mask. This may be useful in certain applications because it provides a mechanism for expanding a guided mode size near an end of the waveguide, thereby increasing the optical fill factor and permitting more efficient coupling of light into the waveguide. Other perturbations, such as image rotations, may be implemented by rotation of the optical pattern and/or of the polymeric material. Magnifications may also be implemented by suitable modifications to the optical intensity pattern.

The ability to incorporate such modifications into the waveguide structure provides significant advantages for a number of applications, particularly those that have specialized optical requirements. For instance, an array that inverts images may be formed by introducing 180° rotations during fabrication. This avoids the deleterious effects of conventional approaches for introducing image inversions in which a fiber array is heated and twisted. Such conventional approaches not only change the overall shape of the array, but also the shapes of the individual guides, adversely affecting such optical properties as their angular acceptance angles. Similarly, waveguide arrays may be fabricated with magnification properties by expanding or contracting the spacing between waveguides by modifying the optical intensity pattern. This also avoids adverse effects characteristic of conventional fiber structures when arrays are heated and compressed.

A variety of other types of changes may be made to the pattern of the waveguides during exposure. These include magnifications that permit the image to be magnified or minified, and may include such arbitrary permutations as switching the order of the waveguides. Such permutations find application, for example, in short-reach communications systems where the order of the waveguides is changed from one side to another. By using methods of the invention, it is possible to route waveguides in three dimensions to avoid crossings, avoiding the need to cross waveguides in two dimensions as is typically required with methods that head and draw glass endoscope arrays or use two-dimensional waveguide lithography. Changes in the waveguide pattern also permit coupling light from one waveguide to another in a controlled manner by modifying the spacing between guides. This has applications for channel coupling or splitting in communication systems.

Figure 1C:
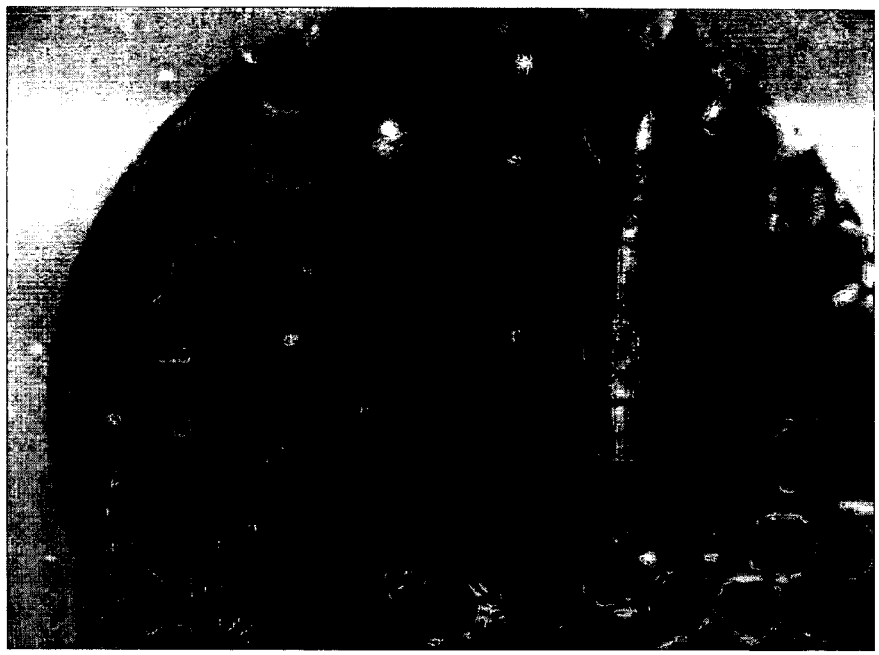
FIG. 1C is a photograph showing a structure of a conventional endoscope.
Figure 1D:
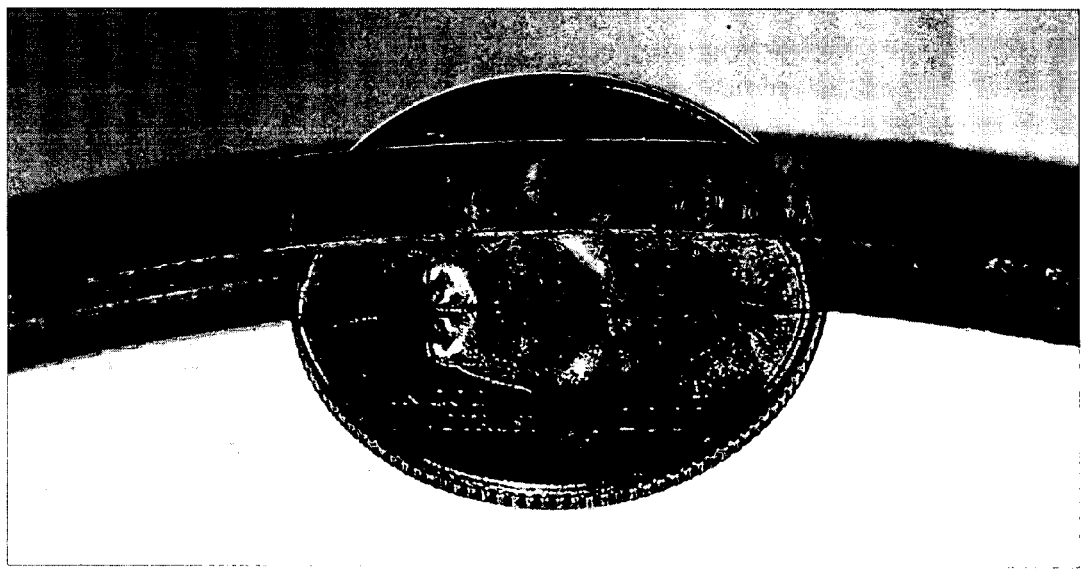
FIG. 1D is a photograph of cast polymer ready for exposure in implementing certain embodiments.

As indicated at block 120 of FIG. 1A, the resulting waveguide structure may be fixed to render it substantially inactive to further light exposure. This may be performed in some embodiments by exposing the photopolymer to substantially uniform illumination, although in other instances thermal annealing or other techniques may be used to fix the waveguide structure. This causes the photopolymer to be rendered substantially inactive while preserving the waveguide structure that has been formed. The resulting waveguide structure is thus a monolithic structure that may subsequently be manipulated mechanically for incorporation into any of a wide variety of devices having optical components. Several examples of specific applications are discussed below, but the resulting structures find general utility in imaging applications, specifically those where an image is transported over some distance. Like conventional fiber arrays, the monolithic waveguide arrays may deliver pixelated images, but are lighter, considerably more flexible, cheaper, and less prone to internal breakage than conventional fiber arrays. The fabrication process readily permits the array of waveguides to be regular and to be matched in pitch to camera or display chips. A comparison of conventional fiber arrays and monolithic waveguide arrays fabricated in accordance with embodiments of the invention is provided with FIGS. 1C and 1D, which are respectively photographs of a conventional fiber array and of a cast polymer ready for exposure fabricated by the inventors. The cast polymer includes color in the polymer corresponding to an initiator capable of absorbing light that leads to an index change, and which bleaches upon uniform exposure to leave the polymer substantially transparent at an operational wavelength.

It is generally noted that the methods of the invention are not constrained by any particular waveguide length, being able to fabricate parts that are very short, very long, or some intermediate length. This is in contrast to fiber drawing, which naturally creates parts that are very long, and which are subsequently cut to desired lengths. This makes the fabrication of customized parts at short lengths very expensive using traditional techniques, an expense that may be avoided with the monolithic waveguide structures described herein.

2. Fabrication Techniques

There are a number of techniques that may be used in different embodiments to expose the photoreactive material to the desired optical intensity pattern. In some embodiments, these techniques provide a intensity pattern at a defined spatial location, such as may be achieved through the use of interferometric or projection lithographic techniques. In other embodiments, such techniques as contact lithography may be used.

Figure 2A:
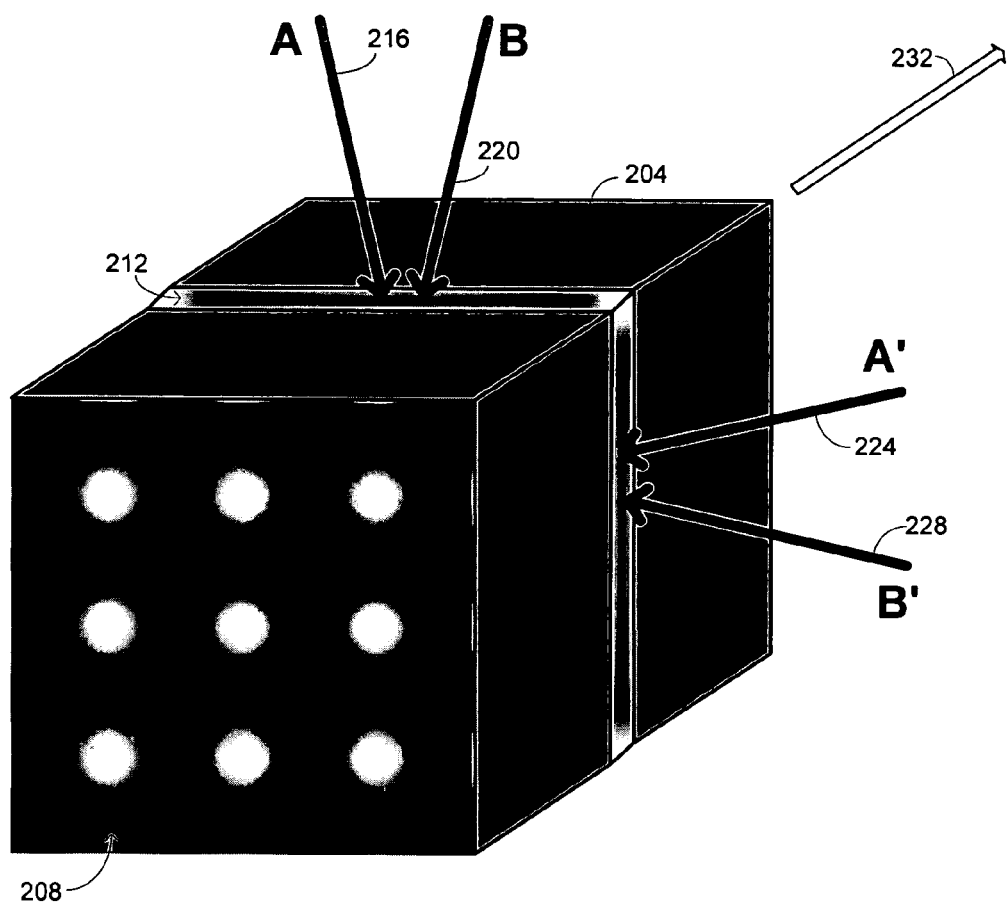
FIG. 2A provides an illustration of an interferometry technique for producing an optical intensity pattern used in forming monolithic waveguide arrays in one embodiment of the invention.

FIG. 2A provides an illustration of the use of an interferometric technique in which the optical intensity pattern 208 is defined by the interference of multiple coherent plane waves. This is a practical method for the production of low-density arrays; the natural sinusoidal shape of the optical exposure is less well suited to the fabrication of high-density arrays, which may require sharper features. While it is possible to add additional plane waves to synthesize a more confined optical pattern, it is generally expected that the practical challenges involved with aligning the phase of the various interference patterns will make other techniques described below preferable for high-density arrays. Such a method does have the advantage of being able to write features from the sides of the photoreactive materials, allowing the fabrication of arbitrarily long lengths of waveguide arrays.

As illustrated in the drawing, the optical intensity pattern 208 comprises a superposition of a plurality of interference patterns, each interference pattern being created by the interference between two incident waves having an angular separation. A first of the interference patterns is created by the interference between waves 216 and 220, identified in the drawing as waves A and B, and a second of the interference patterns is created by the interference between waves 224 and 228, identified in the drawing as waves A' and B'. The interference patterns are incoherent and their intensity sum creates a grid of waveguides within the photoreactive material 204 in plane 212. The specific wavelengths used for each of the waves may depend on the photoreactive characteristics of the material 204 and, in the case of photopolymeric materials, are selected to achieve the desired polymerization reaction. Further discussion is provided below of characteristics of the photoreactive materials that may be used.

Figure 2B:
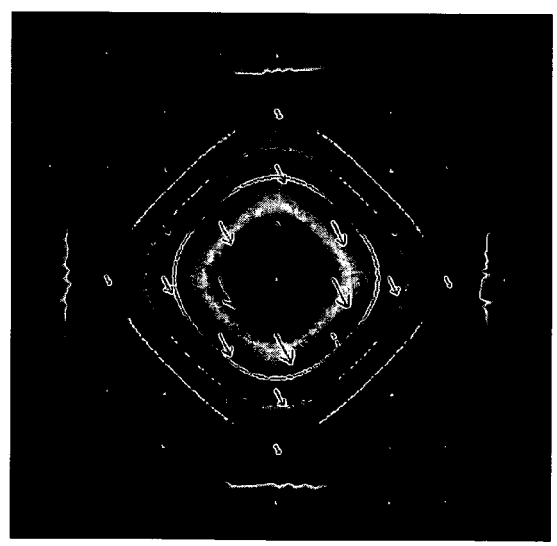
FIG. 2B shows a calculated refractive-index distribution for a mode using the interferometry technique of FIG. 2A and shows the intensity profile of the optical wave guided by this index profile as contours.

Merely by way of example, in one embodiment, coherent waves 216 and 220 comprise plane waves that have an angular separation of about 3°, and coherent waves 224 and 228 similarly comprise plane waves that have an angular separation of about 3°. Each pair of plane waves creates a sinusoidal interference pattern at plane 212 in the material. The intensity sum in this particular example results in a waveguide grid on about a 10 μm pitch when green light of wavelength approximately equal to 500 μm is used. While the drawing illustrates the use of two pairs of coherent waves, other pairs of beams may additionally be used, coherent with one another but incoherent with all the others, to synthesize any desired periodic index pattern as a discrete Fourier series. In one embodiment, the beams are provided in a Talbot reimaging geometry, which as will be known to those of skill in the art permits a small number of plane waves to create a pattern that automatically reforms at a periodic set of planes. Merely by way of illustration, FIG. 2B provides the results of a calculation of the index distribution and the guided mode shape, showing single-mode guiding in one of the guides as a result of such an interferometric technique.

The plane 212 of light formed by cylindrical focusing of the beams thus provides a transverse interference pattern used to expose the waveguides. The desired length of the waveguides is achieved by translation of the photoreactive material 204 through this plane 212. In this way, large numbers (e.g., in excess of $10^5$) of guides may readily be fabricated in parallel in a bulk material, making the process massively parallel and thereby achieving significant economies of scale. Methods using such an interferometry approach are, moreover, amenable to varying the intensity of the optical intensity pattern by varying the intensity of the beams used to generate the pattern. As previously noted, use of such a technique while the material 204 is being translated permits tapers to be introduced into the guided modes. Expanding the guided mode size near ends of an endoscope permits an increase of optical fill factor and more efficient coupling of light from an environment or display. Image rotations may be introduced by rotating the material 204. Magnifications may be implemented by changing the angles between the beams to change the optical pitch.

Figure 3:
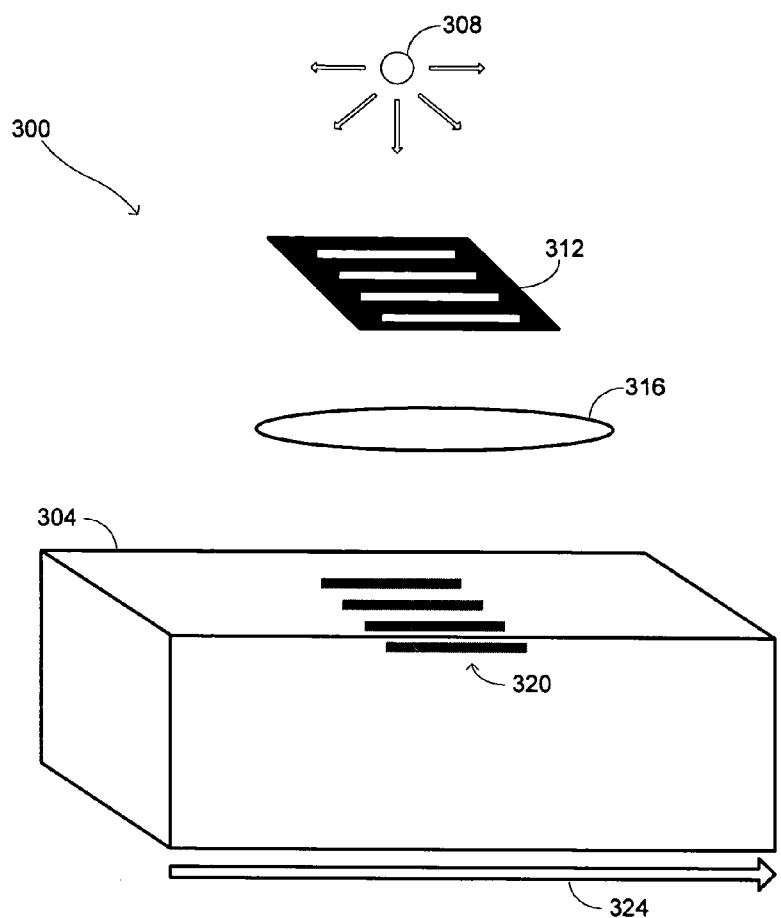
FIG. 3 provides a schematic illustration of a side-projection lithography technique for producing an optical intensity pattern used in forming monolithic waveguide arrays in another embodiment of the invention.
Figure 4:
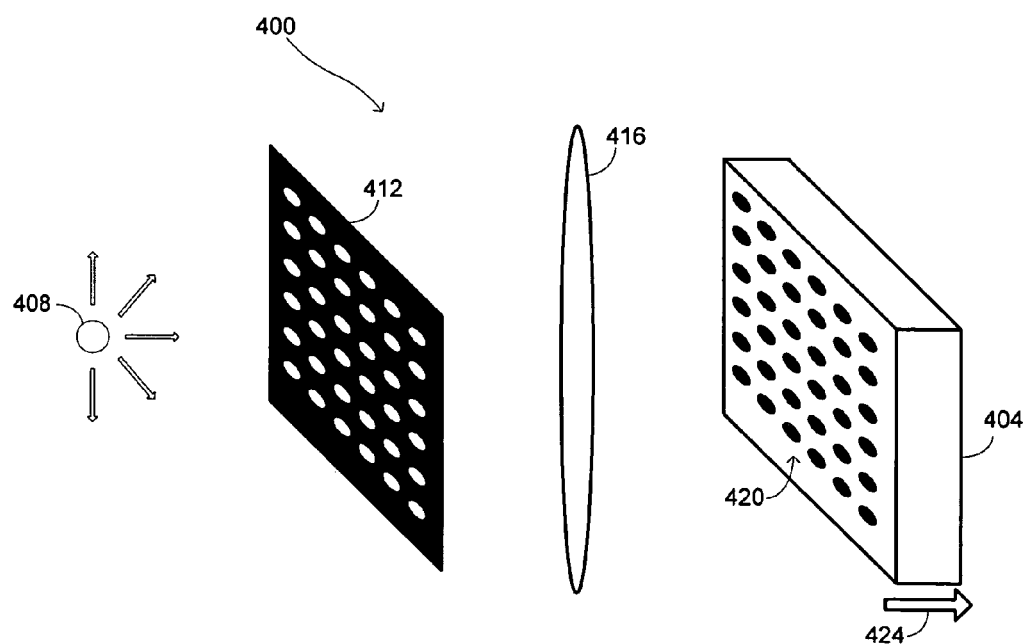
FIG. 4 provides a schematic illustration of a longitudinal-projection lithography technique for producing an optical intensity pattern used in forming monolithic waveguide arrays in a further embodiment of the invention.

Methods that make use of projection lithography are illustrated with the schematic diagrams of FIGS. 3 and 4, which respectively show the use side-incidence and longitudinal-incidence lithographic techniques. In either instance, the lithographic aspects of the techniques are manifested by the use of a mask through which light is passed and focused to generate the desired light pattern in the photoreactive material. In the case of side incidence, as illustrated in FIG. 3, the arrangement 300 thus includes an illumination source 308, a mask 312, an optical arrangement 316, and a mass of photoreactive material 304. The illumination source 308 is provided at a wavelength suitable for achieving the desired polymerization or other reaction in the photoreactive material 304, and thus depends on the specific material selected. The optical arrangement 316 is shown as consisting of a lens, but may more generally include any suitable configuration of optical elements to focus the pattern created by the mask 312 to a desired depth within the photoreactive material 304. Thus, the optical arrangement 316 may more generally include lenses, mirrors, and the like for directing the light transmitted through the mask 312 as desired. Moreover, in some instances the optical arrangement could include dispersive elements or filters to preferentially select certain wavelengths, acting in combination with the specific wavelength characteristics of the light source 308 to transmit the desired pattern with the desired wavelength. Furthermore, while the drawing shows the optical arrangement 316 disposed between the mask 312 and the photoreactive material 304, this is not intended to be limiting; in other embodiments, the optical arrangement could be disposed between the light source 308 and the mask 312 or could have elements both between the light source 308 and mask 312 and between the mask and photoreactive material 304. Also, while the drawing shows both a single light source 308 and a single mask 312, this is merely for purposes of illustration; in other embodiments, a plurality of light sources 308 and/or a plurality of masks 312 may be used to achieve the desired projections.

As evident from the drawing, the mask 312 used for side illumination provides a longitudinal cross section of the pattern 320 to be focused within the photoreactive material 304. Generally, such a longitudinal cross section comprises a plurality of lengths, which are translated transversely through the photoreactive material 304 by translation of the material 304 relative to the light source 308, mask 312, and optical arrangement 316, as indicated by arrow 324. Such side-incidence projection lithography advantageously permits waveguides to made of generally arbitrary length. It will be appreciated, however, that separate exposures will generally be used for different depths within the polymeric material 304, which carries a risk of inadvertent exposure of higher layers in the material while writing on the lower layers. This risk may be mitigated by providing similar projection-lithography arrangements on multiple sides of the photoreactive material 304 and through the use of optical arrangements 316 that provide short depths of field. Additionally, the material response may be engineered to respond preferentially only at the focus by well-known methods such as two-photon or photon-gated sensitization.

Longitudinal incidence like that illustrated in FIG. 4 operates similarly, with an arrangement 400 that comprises a light source 408, a mask 412, an optical arrangement 416, and a mass of photopolymeric material 404. Again, the light source 408 and mask 412 may comprise a plurality of light sources and/or masks, and the optical arrangement 416 may be disposed as shown in the drawing between the mask 412 and material 404 or elsewhere. The optical arrangement 416 may include optical elements as appropriate to focus the pattern 420 produced by the mask 412 into the photoreactive material 404, and may include dispersive elements and/or filters as appropriate in combination with the wavelength characteristics of the light source 408 to provide light reactive with the photoreactive material 404.

In this instance, the mask 412 provides a transverse cross section of the pattern 420 to be focused within the photoreactive material 404, and may thus have a regular cross section that corresponds to the cross-sectional shape of the waveguides to be formed. In some embodiments, the mask substantially comprises a regular array of circles. This cross section is translated through the photoreactive material 404 by translation of the material as indicated by the arrow 424. In some instances, it may be desirable for the optical arrangement 416 to provide a relatively large depth of field. The resulting geometry makes this process generally more suitable for the fabrication of relatively short waveguides, providing waveguides less than about 10 mm in length in some embodiments, and on the order of 1 mm in length in specific embodiments. Other geometrical configurations may use the process to enable the exposure of arbitrarily long lengths using longitudinally incident projection lithography; one such example is discussed in connection with FIGS. 5A and 5B below. A general advantage of the use of longitudinally incident projection lithography is that it enables an entire array to be exposed simultaneously, thereby achieving simplifications over a number of aspects of methods that make use of sequential illuminations.

In other embodiments, direct three-dimensional lithography may be used to form waveguides within photoreactive materials. Such techniques sequentially write each waveguide to fabricate an array. This has the advantage of complete flexibility in that the guides may vary along their length in size, position, shape, and the like. The techniques do generally involve long sequential exposure time and the loss of dynamic range due to unintended exposure as discussed in connection with side-incidence lithographic projection. The loss of dynamic range due to multiple-layer exposure may be overcome with the use of two-photon or photon-gated materials. In addition, different optical profiles in the transverse and longitudinal directions may result in asymmetry of the guides. Such an effect may be accommodated by using beam shaping to compensate for shape limitations. For example, slit beam shaping may be used in a manner similar to that described in M. Ams, G. D. Marshall, D. J. Spence, and M. J. Withford, Optics Express, 13 (15), 5676, the entire disclosure of which is incorporated herein by reference for all purposes. The description in that reference applies to shaping for femtosecond laser direct-write fabrication of symmetric waveguides in bulk glasses, but it will be understood by those of skill in the art that it may be adapted for beam-shaping applications as used herein.

In still other embodiments, a contact lithography technique may be used. In such embodiments, a chamber is filled with a monomer mixture, which is exposed to light through an aligned, contacted photomask. Uncured monomer is removed from the layer and voids are filled with sacrificial material to prepare a level surface for subsequent layers. Upon completion, the sacrificial material is removed to release the waveguide structure. When using such a technique, layers are preferably sufficiently thin that the exposing light transmitted by the mask stays in focus for the entire layer. When automated so that new monomer may be injected without removing the mask, such a technique advantageously permits control over the exposing light to be determined by the mask profile. Since the light does not travel through the side of the material, no dynamic range is lost due to inadvertent exposure. Further details of contact lithographic techniques are described, for example, in U.S. patent application Ser. No. 10/521,635, entitled "Fabrication of 3D Photopolymeric Devices," the entire disclosure of which is incorporated herein by reference for all purposes.

Figure 5A:
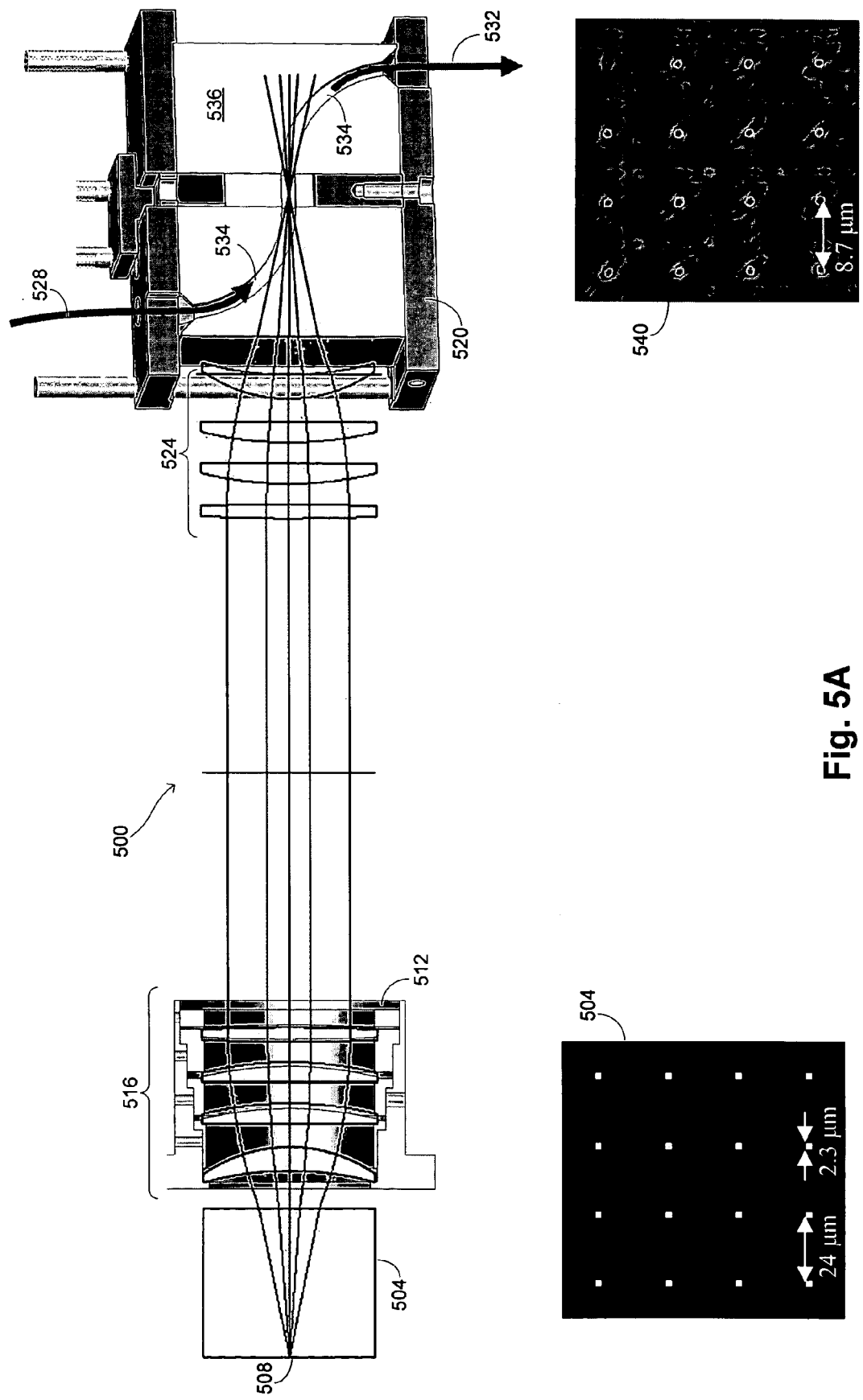
FIGS. 5A and 5B are schematic illustrations of a physical and optical arrangement used for forming monolithic waveguide arrays in one application of the invention.
Figure 5B:
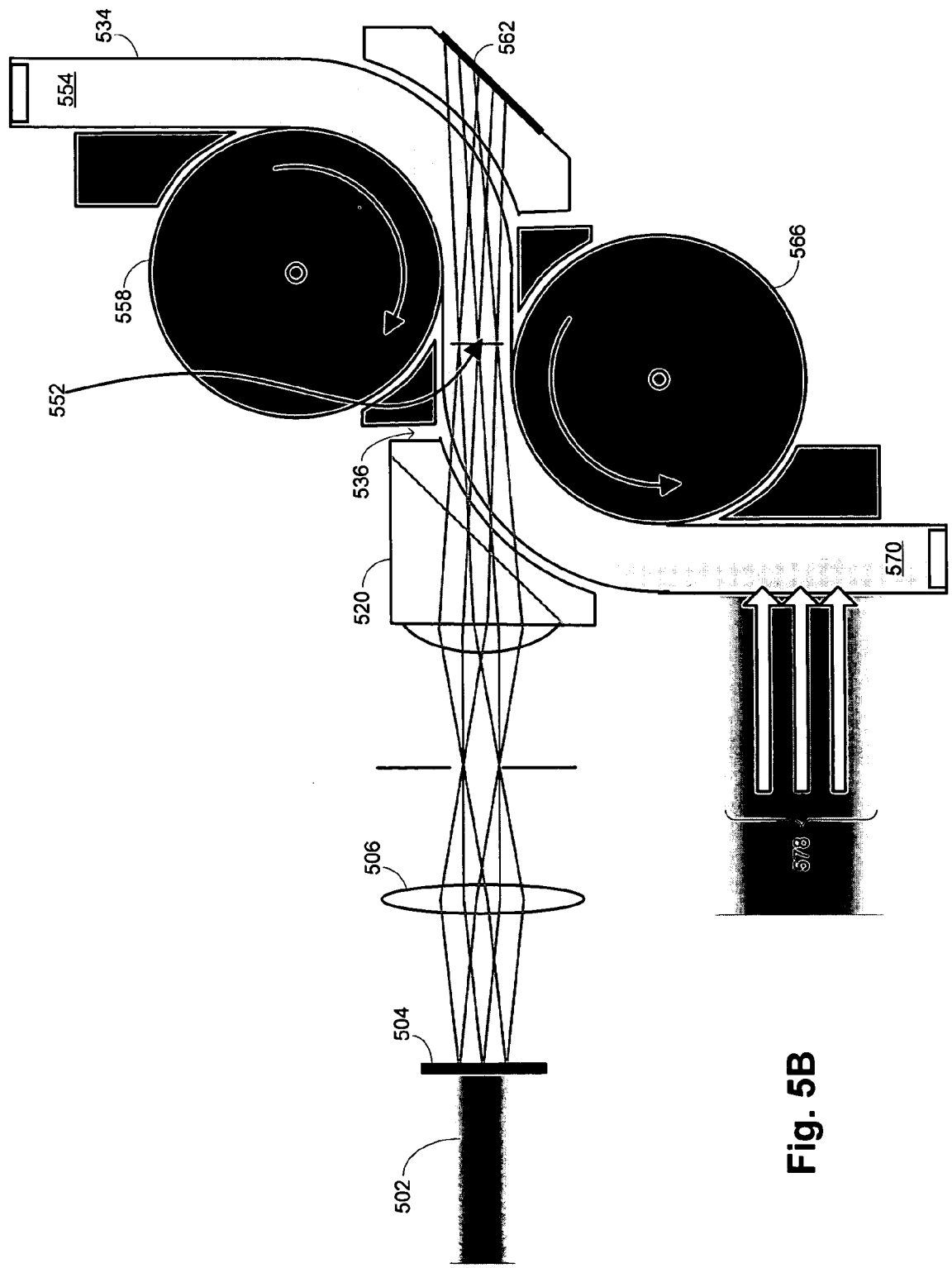

Specific structural arrangements that may be used in implementing methods of the invention are illustrated with FIGS. 5A and 5B. These illustrations are intended for exemplary purposes and other physical arrangements that may be used in alternative embodiments will be evident to those of skill in the art after reading this disclosure. In FIG. 5A, a structural arrangement 500 is shown that uses side-incidence projection lithography as described generally in connection with FIG. 3. In this instance, incoherent light, such as provided by a lamp, illuminates a mask 504 to create an array of optical spots. The example in FIG. 5A shows a particular arrangement in which the mask comprises a rectangular array of square openings, each opening having sides of length 2.3 µm and being separated by 24 µm.

An image of the light that penetrates the mask 504 is created by an optical arrangement. In this example, the optical arrangement comprises a first set of lenses 516 maintained in position by a lens holder 512. This first set of lenses act as projection lenses that collimate the light emanating through the mask 504. The optical arrangement also comprises a second set of lenses 524 that focus the collimated light as an image formed inside the photopolymeric material 534. The photopolymeric material is provided as a cable 534 within an oil-immersion chamber 532 machined with a material that has a similar refractive index as the photoreactive material, which in this illustration is photopolymeric material 534 and the oil 536 used to fill spaces between them. Such an arrangement enables the formation of a high-resolution image. The cable may comprise bare material that has been cast into a cablelike structure or may alternatively comprise a tube within which material has been inserted.

The flexibility of the photopolymeric material is used to bend the cable 534 so that the image is projected through the side, with the optical image being formed substantially normal to the surface of the photopolymeric material. The cable 534 is translated through the chamber 520 as indicated by arrows 528 and 532, exposing a continuous index pattern along the length of the cable 534. As evident from FIG. 5A, the mask image is in focus at a particular plane and out of focus before and after this plane. The out-of-focus light does have some exposure effect on the photopolymeric material, but is of lower intensity and is less localized, creating on average a uniform exposure that does not significantly change the induced index pattern. It is noted, however, that it is generally preferable that light from different spots in the image plane not interfere in these out-of-focus regions, which would cause the out-of-focus light to have a spatial structure. This is evident from the index distribution 540 shown in the drawing that results from use of the mask 540. Such spatial structure may be avoided through use of a spatially incoherent illumination source. The resulting index distribution 540 also shows that the waveguide spacing is determined not only from the spacing of openings in the mask 504 but also from how the optical arrangement is configured to project its image. In this instance, the 24-µm spacing between openings in the mask results in an 8.7-µm waveguide spacing.

The finite resolution of the lenses that project the light from the mask to the polymer in combination with the gradual transition from in-focus to out-of-focus planes causes the exposure of the photopolymeric material to be somewhat smooth. In other words, the process enables the production of gradient-index ("GRIN") structures, which are distinct from the binary index structures characteristic of conventional glass-fiber waveguides. Gradient-index structures advantageously provide less dispersion and are better adapted for use in more complex parts, some of which are described further below.

Certain variations that may be made to an arrangement like that of FIG. 5A are illustrated schematically in FIG. 5B. In this drawing, the light source 502, mask 504, and optical arrangement 506 are shown, with an alternative mechanism shown for translating the photopolymeric material through the mask image plane 552. While FIG. 5A shows an arrangement where the polymer slides over curved glass surfaces, FIG. 5B instead shows that the cable 534 may be moved as a whole by a plurality of rotating drums 558 and 566 between which the cable 534 is disposed. The drums 558 and 566 advantageously comprise arcuate surfaces provided in contact with the cable 534 to impart the desired curvature to the cable 534 as it is moved, accomplishing translation by spooling the cable 534 outside of the chamber, somewhere in the direction of arrow 532. In addition, the photopolymer may be disposed within a tube substantially transparent at the wavelengths used to generate the FIG. 5B illustrates that a curing step may be performed as described in connection with block 120 of FIG. 1 after exposure to the mask image. This may be performed with substantially uniform illumination 578 so that, within the cable 534, polymeric material 554 that precedes the mask image plane 552 is uncured but polymeric material 570 that follows the mask image plane 552 is cured. The drawing also additionally illustrates that the optical arrangement may sometimes comprise optical elements like mirror 562 disposed at locations other than between the mask 504 and the polymeric material to achieve focusing at the desired plane 552.

It is noted that a general consideration in the design of the optical arrangement is to provide near-diffraction limited focus throughout the material depth for appropriate spot size and spacing. Merely by way of example, in some embodiments, the spot size is on the order of 1 µm with spacing on the order of 10 µm. To provide such focus, the optical arrangement may include elements that correct spherical aberrations and other optical aberrations that may result from the use of off-the-shelf optical elements.

3. Materials

There are a variety of different materials that may be used in embodiments of the invention. The invention is not limited to the use of any particular material, provided it has the property that its index of refraction may be increased with exposure to light. In some instances, the increase in index of refraction is permanent. Different materials may respond to different light wavelengths depending on the specific chemistry of the material.

In some instances, the uncured material comprises monomers that react to light at an appropriate wavelength to join and form polymers. By exposing the material to an optical intensity pattern, polymerization takes place locally in the region of exposure, causing a local depletion in monomer concentration. The resulting concentration gradient causes monomer diffusion from the bulk material into the locally depleted regions, thereby increasing the local density and refractive index. In cases where a single photon initiates polymerization, the increase in refractive index is typically approximately linearly proportional to the energy density of the exposure. In cases where two photons initiate polymerization, the increase in refractive index is approximately quadratically proportional to the energy density of the exposure. In another approach, a multicomponent system is used in which one of the monomers has a high refractive index and polymerizes relatively rapidly while a second monomer has a low refractive index and polymerizes relatively slowly. Exposure to an optical intensity pattern causes the high-index monomer to be consumed more rapidly, developing a concentration gradient that causes diffusion of the high-index monomer from the bulk into the region where polymerization is occurring. In the nonpolymerizing areas, low-index polymer is created with the subsequent curing of the entire material.

One class of materials that have the desired properties and which may accordingly be used to provide the photoreactive material includes thiol-ene materials. A detailed description of such materials is provided, for example, in U.S. Pat. Publ. No. 2003/0144373, entitled "DEGRADABLE THIOL-ENE POLYMERS," filed Oct. 10, 2002 by Christopher Bowman et al. Briefly, thiol-ene photopolymerizations are based on radical-mediated addition of a thiol to a vinyl functional group with the net reaction:

RSH+R'C=C→RSCCR'.

The polymerization proceeds by a step growth mechanism via sequential propagation of a thiyl radical through a vinyl functional group and the subsequent chain transfer to the thiol, regenerating the thiyl radical. This successive propagation/chain-transfer mechanism is the basis for the thiol-ene step growth mechanism as presented in the following scheme:

Step 1: Propagation RS·+R'CH=CH$_2$→R'C·H—CH$_2$SR;

Step 2: Chain Transfer R'C·H—CH$_2$—SR+ RSH→R'CH$_2$—CH$_2$—SR+RS·.

Radicals may be introduced into the system or initiated via radical photoinitiators, such as benzophenone or dimethoxyphenyl acetophenone through photopolymerizations in the absence of added initiator. Radical termination may occur via bimolecular radical-radical recombinations.

Thiol-ene polymerizations are not significantly inhibited by oxygen and exhibit rapid polymerizations. In addition, thiol-ene photopolymerization reactions may be performed with little or no added photoinitiator molecules, leading to improved optical clarity and reliability over other photopolymers. Photopolymerizations performed without initiators form polymers with minimal absorption from the near-ultraviolet to the near-infrared regions, rendering them less susceptible to radiation damage. Furthermore, the minimal absorption of the initiating wavelengths in initiating polymerization is eliminated or reduced by complete polymerization of the thiol and ene functional groups. Also, with such thiol-ene materials, the polymerizations proceed via a step growth mechanism, in which molecular weights build up slowly and gelation does not occur until high conversion. This is in contrast to other types of photopolymerization in which molecular weights are low and monomer diffusivity is high.

In certain embodiments, at least one of R and R' is degradable. Examples of one or both of R and R' include poly(lactic acid) ("PLA"); polyglycolide ("PGA"); copolymers of PLA and PGA ("PLGA"); poly(vinyl alcohol) ("PVA"); poly(ethylene glycol) ("PEG"); poly(ethylene oxide); poly(ethylene oxide)-co-poly(propylene oxide); block copolymers such as poloxamers or meroxapols; poloxamines; polyanhydrides; polyorthoesters; poly(hydroxy acids); poly-dioxanones; polycarbonates; polyaminocarbonates; poly(vinyl pyrrolidone); poly(ethyl oxazoline); carboxymethyl cellulose; hydroxyalkylated celluloses such as hydroxyethyl cellulose and methylhydroxypropyl cellulose; and natural polymers such as polypeptides, polysaccharides, or carbohydrates such as polysucrose, hyaluranic acid, dextran, and similar derivatives thereof; heparan sulfate; chondroitin sulfate; heparin; or alginate; and proteins such as gelatin, collagen, albumin, or ovalbumin; or copolymers; or blends thereof. Each of R and R' can vary in size, with the molecular weight for R and/or R' ranging from about 30 Da to about 50,000 Da.

Other commercially available materials that may be used include Tapestry™, available from InPhase and described in L. Dhar, A. Hale, H. E. Katz, M. L. Schilling, M. G. Schnoes, and F. C. Schilling, "Recording media that exhibit high dynamic range for digital holographic data storage," Optics Letters 24, 487 (1999), the entire disclosure of which is incorporated herein by reference for all purposes. Another material that may be used is CROP, available from Aprilis, Inc. and described in D. A. Waldman, R. T. Ingwall, P. K. Dhal, M. G. Horner, E. S. Kold, H.-Y. S. Li, R. A. Minns, and H. G. Schild, "Cationic ring-opening photopolymerizaton methods for volume hologram recording," Proc. SPIE 2689, 127 (1996), the entire disclosure of which is also incorporated herein by reference for all purposes. Further materials that may be used include several different materials commercially available from DuPont, including Omnidex film, and described in W. J. Gambogi, A. M. Weber, and T. J. Trout, "Advances and Applications of DuPont Holographic Photopolymers," Proc. SPIE 2043, 2 (1993), the entire disclosure of which is also incorporated herein by reference for all purposes. Other descriptions that describe similar materials and related diffusion processes include the following, each of which is incorporated herein by reference for all purposes: W. S. Colburn and K. A. Haines, "Volume hologram formation in photopolymer materials," Appl. Opt. 10, 1636 (1971); G. Zhao and P. Mouroulis, "Diffusion model of hologram formation in dry photopolymer materials," J. Mod. Opt. 41, 1929 (1994); and V. L. Colvin, R. G. Larson, A. L. Harris, and M. L. Schilling, "Quantitative model of volume hologram formation in photopolymers," J. Appl. Phys. 81, 5913 (1997).

4. Exemplary Applications

It will be recognized by those of skill in the art that there are numerous applications that are enabled by the waveguides and endoscopes produced in accordance with embodiments of the invention. The following description is provided of certain applications for purposes of illustration, with the recognition that numerous other applications will be evident after reading this disclosure.

Many applications of the waveguides and endoscopes produced in accordance with embodiments of the invention derive from their ability to transfer a pixelated image. Briefly, each of the waveguides transfers an image from one end to another end as a consequence of total internal reflection within the waveguide. The total internal reflection is a consequence of the refractive-index properties imposed by the fabrication techniques. An array of waveguides thus defines an endoscope that may transfer an image as a set of pixels corresponding to each of the component waveguides from one end to another end. In some embodiments, the ability to control the optical intensity pattern in defining the waveguide array enables precise registration of the waveguides to a regular grid defined by a camera or display device. This enhances the resolution of images transferred by endoscopes in communication with cameras or display devices, a feature that has significant advantages in many applications, one of which is the improved diagnostic ability that results for improved resolution in medical applications.

Figure 6B:
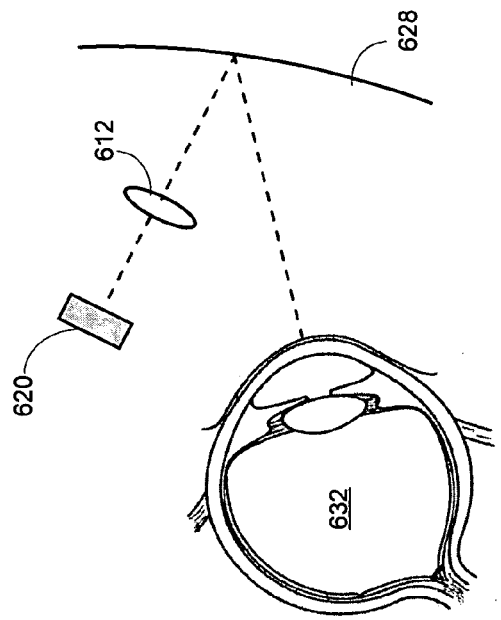
FIGS. 6A and 6B illustrate physical and optical arrangements respectively for a heads-up display application of the invention.
Figure 6A:
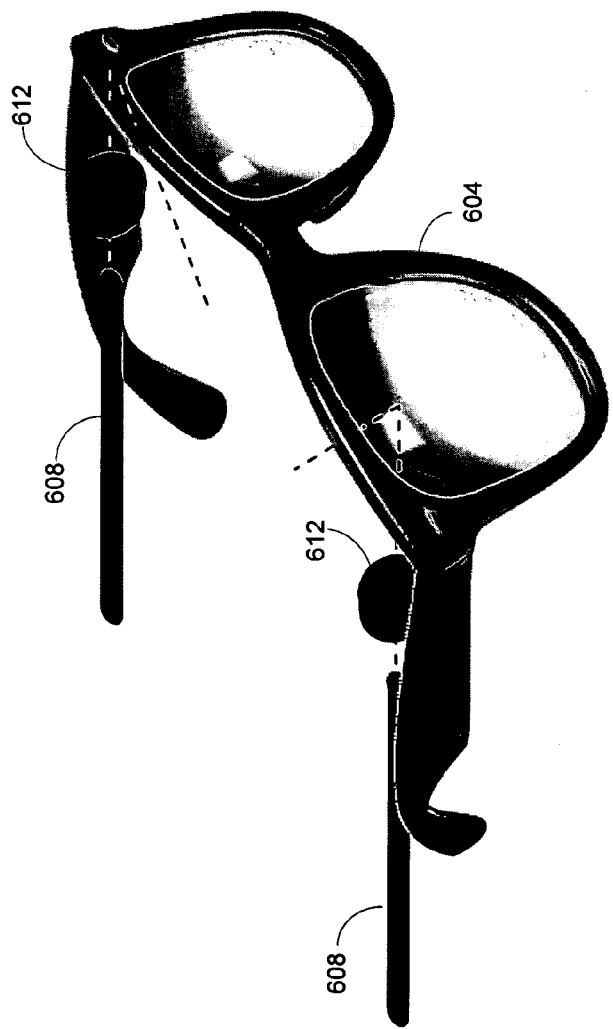

Other examples of applications that make use of the pixelated-image-transfer properties of such endoscopes include video-transfer devices from a body or vehicle-mounted source to a helmet or eyeglasses, as illustrated in FIGS. 6A and 6B. FIG. 6A shows a physical layout in an embodiment mounted to eyeglasses, while FIG. 6B shows a corresponding optical layout. In this drawing, a pair of endoscopes 608 fabricated as described above are mounted to the frame 604 of the eyeglasses, with each endoscope 608 providing an image that may be projected onto and reflected from a partially reflective surface 628 mounted in the eyeglasses. A lens 612 may be provided for each endoscope 608 to focus the transferred image 620 within the observer's eye 632. The lightweight character of the polymer endoscopes 608 significantly reduces the weight to be carried by a person's head, enabling such their use in such applications.

In other instances, a similar arrangement may be configured to operate in reverse, transferring images of the eye 632 to a remote detector. Such eye monitoring finds applications as a fatigue detector in military and other applications, or may be used as an interface with people suffering from paralysis, using detected eye movements to provide instructions to a remote device. This is an example of a more general class of applications in which image data are transferred from a lightweight sensor over the endoscope to a remote, heavier detector or other device. By gathering the images into a polymer waveguide like those described above and routing it to a remote camera, the system may be significantly lighter and more convenient.

More generally, the transfer of images may be made from any image forming system to a remote device. This finds utility in such other applications as where images are to be collected from a harsh environment, permitting the remote device to be located in a protected environment. Examples of such uses include deployment of image-collecting systems on the exterior of vehicles, avoiding the need to deploy both a lens and a delicate camera chip in the harsh environment.

Certain image-processing operations may also be performed in some embodiments. Many continuous optical systems like lens arrangements use well-established optical processing methods to modify, detect, or correlate a collected image. The waveguide arrays comprised by polymer endoscopes permit the implementation of analogs of such methods to discrete optical systems. For instance, certain spatial frequencies of a collected image might be filtered in the waveguide array via a holographic Bragg grating written in the direction of propagation. This would reflect a narrow band of guided modes that match the period of the grating. In a coupled array of waveguides, a narrow range of longitudinal spatial frequencies corresponds to a narrow range of transverse spatial frequencies of the image. Thus, tuning the grating period by stretching the array permits selective filtering of certain spatial frequencies of the image.

The methods described herein may also be used in the fabrication of lenslet arrays. For instance, the process illustrated in connection with FIGS. 5A and 5B may be modified to increase or decrease the size of the guided modes near the ends of the cable. This may be done by changing the exposure intensity, changing the translation speed, or changing the size of the exposing spots. A change in translation speed results in a change in the peak index change. The size of the exposing spots may be changed by modifying the mask or the f/# of the imaging system to change the size of the index change. A lenslet array is thus created by increasing the waveguide diameters to a size comparable to the spacing between the guides. The lens power in such structures is created by the gradient index in the polymer volume instead of as a result of surface curvature. Such methods for fabricating lenslet arrays provides enhanced ability to control the refractive-index profile in a precise manner, resulting in higher quality lenses or the ability to fabricate lenses for specialized applications.

In another application, the ability for waveguide arrays to record perturbations in the optical intensity pattern relative to the photoreactive material is used to implement an image inverter. Specifically, the waveguides may be created in a spiral pattern by rotating the photoreactive material or by rotating the optical intensity pattern, as may be achieved by rotation of the mask. Image inverters find utility is such devices as night goggles, which naturally have optical systems that produce images requiring inversion. Use of the monolithic waveguide arrays in this way avoids a number of undesirable features characteristic of traditional array image inverters, which are formed by heating a glass-fiber array and twisting the array by 180°. In particular, such traditional approaches introduce a waist-like structure in the inverter where the array was twisted, which results in a lower numerical aperture in that region that decreases the maximum optical transmission. The introduction of such a structure is avoided using the methods of the invention. In addition, an inverter produced in accordance with embodiments of the invention enjoys the advantages of lower weight and lower cost that are general features of the polymeric waveguide structures described herein. The reduction in weight of this component consequently reduces the weight of devices that incorporate it, a factor that is significant, for example, in the case of night goggles worn on a person's head—it interferes less with the military and other specialized operations performed with night goggles.

In other embodiments, an arbitrary spatial-light modulator may be implemented with waveguide arrays having permutations in which the waveguides travel different paths. An example of a structure that may be fabricated with relative ease is a "perfect shuffle," an optical interconnect that provides an efficient mechanism for sorting data, and which is so named in analogy to card shuffling. A perfect shuffle is an especially challenging device to fabricate with a planar waveguide circuit because of the large number of crossings.

Methods of the invention may also be used in the fabrication of photonic-crystal waveguides. By reducing the scale of the mask, the same exposure system may be used to created more complex guided-wave structures. The various applications described above are examples of index-guiding applications in which light is confined to a small region due to the lower speed of light near the axis. Photonic crystal waveguides operate by forming a region of space in which light of certain angles and/or wavelengths cannot propagate. The light is then guided within such a region by being unable to escape. The following publications, each of which is incorporated herein by reference in its entirety for all purposes, have shown that this functionality may be achieved with index contrast as low as 0.02: J. Riishede, J. Laegsgaard, J. Broeng, and A. Bjarklev, "All-silica photonic bandgap fibre with zero dispersion and a large mode area at 730 nm," J. Opt. A: Pure Appl. Opt. 6, 667–670 (2004) and A. Argyros, T. A. Birks, S. G. Leon-Saval, C. M. B. Cordeiro, F. Luan, and P. St. J. Russell, "Photonic bandgap with an index step of one percent," Optics Express 13, 309 (2005). The ability to establish photonic bandgap guiding with such index contrasts enables control of waveguide dispersion and mode size in ways unavailable for traditional index guiding. For example, in some embodiments, this enables the transmission of femtosecond pulses in polymers, permitting the creation of integrated optics in the femtosecond regime.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of fabricating a waveguide array, the method comprising:
   providing a photoreactive material;
   generating an optical intensity pattern corresponding to a geometry of the waveguide array;
   effecting a relative translation of the photoreactive material through the optical intensity pattern; and
   thereafter, rendering the photoreactive material substantially unreactive to light at at least a wavelength of the optical intensity pattern.

2. The method recited in claim 1 wherein rendering the photoreactive material substantially unreactive to light comprises exposing the photoreactive material to a substantially uniform light.

3. The method recited in claim 1 wherein rendering the photoreactive material substantially unreactive to light comprises thermally annealing the photoreactive material.

4. The method recited in claim 1 wherein the photoreactive material comprises a photoreactive polymer precursor.

5. The method recited in claim 1 wherein generating the optical intensity pattern comprises:
   illuminating the photoreactive material with a first set of mutually coherent waves focused onto a portion of a plane passing through the photoreactive material; and
   illuminating the portion of the plane with a second set of mutually coherent waves, wherein the second set of waves is incoherent with the first set of waves to generate an interference pattern in the portion of the plane.

6. The method recited in claim 5 further comprising illuminating the portion of the plane with a third set of mutually coherent waves, wherein the third set of waves is incoherent with the first set of waves and incoherent with the second set of waves.

7. The method recited in claim 1 wherein generating the optical intensity pattern comprises:
   generating light with an illumination source;
   filtering the generated light with a mask having a portion substantially opaque to a wavelength reactive with the photoreactive material and a portion substantially transparent to the wavelength; and
   focusing the filtered light within the photoreactive material as the optical intensity pattern.

8. The method recited in claim 7 wherein the mask is disposed to generate the optical intensity pattern in a focal plane substantially parallel to a direction of the relative translation.

9. The method recited in claim 7 wherein the mask is disposed to generate the optical intensity pattern in a focal plane substantially perpendicular to a direction of the relative translation.

10. The method recited in claim 7 wherein the generated light is spatially incoherent.

11. The method recited in claim 1 wherein:
    generating the optical intensity pattern comprises:
       generating a first optical intensity pattern corresponding to a geometry of a first subset of the waveguide array; and
       generating a second optical intensity pattern corresponding to a geometry of a second subset of the waveguide array, wherein the second subset is different from the first subset; and
    effecting the relative translation of the photoreactive material through the optical intensity pattern comprises:
       effecting a first relative translation of the photoreactive material through the first optical intensity pattern before generating the second optical intensity pattern; and
       effecting a second relative translation of the photoreactive material through the second optical intensity pattern after generating the second optical intensity pattern.

12. The method recited in claim 1 wherein:
    generating the optical intensity pattern comprises generating a separate optical intensity pattern for each waveguide comprised by the waveguide array; and
    effecting the relative translation of the photoreactive material through the optical intensity pattern comprises effecting a separate relative translation of the photoreactive material through each separate optical intensity pattern.

13. The method recited in claim 1 wherein generating the optical intensity pattern comprises:
    filling a chamber with the photoreactive material; and
    exposing the photoreactive material to light through a photomask in contact with the photoreactive material.

14. The method recited in claim 1 wherein effecting the relative translation of the photoreactive material through the intensity pattern comprises:
    maintaining the optical intensity pattern in a substantially fixed spatial location; and
    moving the photoreactive material through the fixed spatial location.

15. The method recited in claim 14 wherein moving the photoreactive material through the fixed spatial location comprises:
    providing the photoreactive material in a structure substantially transparent at a wavelength reactive with the photoreactive material; and
    moving the structure.

16. The method recited in claim 15 wherein moving the structure comprises moving the structure through an oil immersion chamber filled with oil having a refractive index similar to a refractive index of the photoreactive material.

17. The method recited in claim 1 wherein effecting the relative translation of the photoreactive material through the optical intensity pattern comprises moving the optical intensity pattern.

18. The method recited in claim 1 further comprising changing the optical intensity pattern while effecting the relative translation of the photoreactive material through the optical intensity pattern.

19. The method recited in claim 18 wherein changing the optical intensity pattern comprises changing an energy density of the optical intensity pattern.

20. The method recited in claim 18 wherein changing the optical intensity pattern comprises rotating the optical intensity pattern relative to the photoreactive material.

21. The method recited in claim 18 wherein changing the optical intensity pattern comprises changing a size and/or shape of the optical intensity pattern.

22. The method recited in claim 1 wherein effecting the relative translation of the photoreactive material through the optical intensity pattern comprises changing a translation speed of the photoreactive material relative to the optical intensity pattern.

23. The method recited in claim 1 further comprising rotating the photoreactive material relative to the optical intensity pattern while effecting the relative translation of the photoreactive material through the optical intensity pattern.

24. The method recited in claim 1 wherein a refractive index of the photoreactive material increases at locations of exposure to light of a defined wavelength.

25. The method recited in claim 24 wherein the refractive index of the photoreactive material increases with an energy density of the exposure to light of the defined wavelength.

26. The method recited in claim 25 wherein the refractive index of the photoreactive material increases approximately linearly with the energy density of the exposure to light of the defined wavelength.

27. A waveguide array fabricated according to the method of claim 1.

28. A method of fabricating a waveguide array, the method comprising:
  providing a photoreactive polymer precursor in a structure substantially transparent at a wavelength reactive with the photoreactive polymer precursor;
  generating light with a spatially incoherent light source;
  filtering the generated light with a mask having a portion substantially opaque to the wavelength and a portion substantially transparent to the wavelength;
  focusing the filtered light within the photoreactive polymer precursor as an optical intensity pattern;
  maintaining the optical intensity pattern in a substantially fixed spatial location;
  moving the structure to translate the photoreactive polymer precursor through the fixed spatial location; and
  thereafter, exposing the photoreactive polymer precursor to a substantially uniform light to cure the photoreactive polymer precursor.

29. The method recited in claim 28 wherein the mask is disposed to generate the optical intensity pattern substantially parallel to a direction of translation of the photoreactive polymer precursor.

30. The method recited in claim 28 wherein the mask is disposed to generate the optical intensity pattern substantially perpendicular to a direction of translation of the photoreactive polymer precursor.

31. The method recited in claim 28 further comprising changing the optical intensity pattern while moving the structure.

32. The method recited in claim 28 further comprising rotating the structure to rotate the photoreactive polymer precursor while moving the structure.

33. A waveguide array fabricated according to the method of claim 28.

* * * * *